US012591505B2

(12) United States Patent
Arguelles et al.

(10) Patent No.: US 12,591,505 B2
(45) Date of Patent: **\*Mar. 31, 2026**

(54) ANALYSIS OF CODE COVERAGE DIFFERENCES ACROSS ENVIRONMENTS

(71) Applicant: Amazon Technologies, Inc., Seattle, WA (US)

(72) Inventors: Carlos Arguelles, Edmonds, WA (US); Mihaela Petrescu, Seattle, WA (US); Xin-Liu Yao, Kenmore, WA (US); Adithya Venkatesh, Seattle, WA (US); James Beavis, Seattle, WA (US); Andy Kohn, Vaucluse (AU)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/054,857

(22) Filed: Nov. 11, 2022

(65) Prior Publication Data

US 2023/0144084 A1     May 11, 2023

Related U.S. Application Data

(63) Continuation of application No. 16/796,771, filed on Feb. 20, 2020, now Pat. No. 11,500,761.

(51) Int. Cl.
*G06F 11/3668*          (2025.01)
*G06F 11/30*            (2006.01)

(52) U.S. Cl.
CPC ........ *G06F 11/3676* (2013.01); *G06F 11/302* (2013.01); *G06F 11/3079* (2013.01);
(Continued)

(58) Field of Classification Search
CPC .. G06F 11/302; G06F 11/368; G06F 11/3079; G06F 11/3676; G06F 11/3688; G06F 11/3692
See application file for complete search history.

(56) References Cited

U.S. PATENT DOCUMENTS 6,031,990 A     2/2000  Sivakumar et al.
6,748,584 B1    6/2004  Witchel et al.
          (Continued)

OTHER PUBLICATIONS

Shuai Hao et al., "SIF: a selective instrumentation framework for mobile applications," 2013 [retrieved on Dec. 4, 2024], MobiSys '13: Proceeding of the 11th annual international conference on Mobile systems, applications, and services, pp. 167-180, downloaded from <url>:https://dl.acm.org. (Year: 2013).*

(Continued)

*Primary Examiner* — S. Sough
*Assistant Examiner* — Stephen D Berman
(74) *Attorney, Agent, or Firm* — Robert C. Kowert; Kowert, Hood, Munyon, Rankin & Goetzel, P.C.

(57)          ABSTRACT

Methods, systems, and computer-readable media for analysis of code coverage differences across environments are disclosed. A code coverage profiling system determines a first code coverage profile associated with execution of program code in a first environment. The first code coverage profile indicates one or more portions of the program code that were executed in the first environment. The code coverage profiling system determines a second code coverage profile associated with execution of the program code in a second environment. The second code coverage profile indicates one or more portions of the program code that were executed in the second environment. The code coverage profiling system performs a comparison of the first code coverage profile and the second code coverage profile. The comparison determines a difference between the portions of the program code that were executed in the first and second environments.

20 Claims, 9 Drawing Sheets

(52) U.S. Cl.
CPC ........ *G06F 11/368* (2013.01); *G06F 11/3688* (2013.01); *G06F 11/3692* (2013.01)

(56) References Cited

U.S. PATENT DOCUMENTS

| | | | |
|---|---|---|---|
| 8,458,669 B2 | 6/2013 | Glowaty | |
| 8,495,574 B2 | 7/2013 | Harding et al. | |
| 8,745,592 B1 | 6/2014 | Ormandy et al. | |
| 8,850,270 B2 | 9/2014 | Heiper et al. | |
| 8,892,953 B2 | 11/2014 | Frohlich et al. | |
| 8,898,639 B2 | 11/2014 | Lawrance et al. | |
| 9,559,928 B1 | 1/2017 | Porter | |
| 9,727,448 B1 | 8/2017 | Seibert, Jr. | |
| 10,515,002 B2 | 12/2019 | Takawale et al. | |
| 11,500,761 B1 | 11/2022 | Arguelles et al. | |
| 2004/0025088 A1* | 2/2004 | Avvari | G06F 11/3676 |
| | | | 714/E11.207 |
| 2005/0160405 A1* | 7/2005 | Lunia | G06F 8/41 |
| | | | 717/124 |
| 2005/0223357 A1 | 10/2005 | Benerjee | |
| 2008/0172580 A1* | 7/2008 | Davia | G06F 11/3676 |
| | | | 714/38.14 |
| 2009/0313607 A1* | 12/2009 | Harding | G06F 11/3676 |
| | | | 717/125 |
| 2010/0131930 A1* | 5/2010 | Ben-Chaim | G06F 11/3688 |
| | | | 717/127 |
| 2011/0289356 A1* | 11/2011 | Hossain | G06F 11/3672 |
| | | | 714/38.1 |
| 2014/0101672 A1 | 4/2014 | Holmberg | |
| 2015/0026664 A1* | 1/2015 | Bartley | G06F 11/3676 |
| | | | 717/124 |
| 2015/0347278 A1 | 12/2015 | Sinha | |
| 2016/0259713 A1* | 9/2016 | Belur | G06F 11/368 |
| 2017/0091069 A1* | 3/2017 | Fujiwara | G06F 8/65 |
| 2017/0132121 A1* | 5/2017 | Cooper | G06F 11/3692 |
| 2018/0081791 A1* | 3/2018 | Alabes | G06F 11/3692 |
| 2018/0288129 A1 | 10/2018 | Joshi | |
| 2021/0026761 A1* | 1/2021 | Duffy | G06F 11/368 |

OTHER PUBLICATIONS

David Tengeri et al., "Beyond code coverage—An approach for test suite assessment and improvement," 2015 [retrieved on Jan. 11, 2025], 2015 IEEE Eighth International Conference on Software Testing, Verification and Validation Workshops (ICSTW), pp. 1-7, downloaded from <url>:https://ieeexplore.ieee.org. (Year: 2015).*
Pilgun et al., "Fine-grained Code Coverage Measurement in Automated Black-box Android Testing," Dec. 27, 2018 [retrieved Nov. 14, 2025], p. 1-25, downloaded from <url>:https://arxiv.org/pdf/1812.10729. (Year: 2018).*
Perez et al., "A dynamic code coverage approach to maximize fault localization efficiency," Apr. 2014 [retrieved Nov. 14, 2025], Journal of Systems and Software, vol. 90, pp. 18-28, downloaded from <url>:https://www.sciencedirect.com/science/article/pii/S0164121214000090. (Year: 2018).*
Ulf Erikkson, "Measuring Code Quality with Test Coverage Metrics", ReQtest.com, pp. 1-12.
Ulf Erikkson, "Measuring Code Quality with Test Coverage Metrics", ReQtest.com, pp. 1-12, 2018.

* cited by examiner

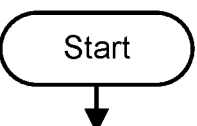

Start

Execute program code for a software product in a first environment (e.g., in a test environment according to a test suite); generate a first set of code coverage data
800

Using the first set of code coverage data, determine a first code coverage profile indicating one or more portions of the program code that were executed in the first environment
810

Execute the program code in a second environment (e.g., in a production environment using requests from real-world clients); generate a second set of code coverage data
820

Using the second set of code coverage data, determine a second code coverage profile indicating one or more portions of the program code that were executed in the second environment
830

Perform a comparison of the first and second code coverage profiles; the comparison determines a difference between the portion(s) of the program code that were executed in the first and second environments
840

Perform one or more actions based (at least in part) on the comparison
850

End

FIG. 8

ANALYSIS OF CODE COVERAGE DIFFERENCES ACROSS ENVIRONMENTS

This application is a continuation of U.S. patent application Ser. No. 16/796,771, filed Feb. 20, 2020, which is hereby incorporated by reference herein in its entirety.

BACKGROUND

Large-scale computing systems, such as those associated with network-based production services, have become widely available in recent years. Examples of such systems include online merchants, internet service providers, online businesses such as photo processing services, corporate networks, cloud computing services, web-based hosting services, etc. These entities may maintain large numbers of computing devices (e.g., thousands of hosts) which are hosted in geographically separate locations and which are configured to process large quantities (e.g., millions) of client requests daily or even hourly. Complex systems may include many services that interact with one another in varied ways.

Automated testing of such services is an increasingly important part of the software development process. A suite of automated tests may be run to verify the expected operation of the software. During this testing process, the code coverage of the tests may be measured. The test suite may execute only a portion of the program code, and code coverage may indicate which lines of code were executed during the testing. For example, the test suite may exercise 70% of the code while leaving 30% of the code untested. Such testing typically involves unit testing in which individual software modules are tested independently of one another.

BRIEF DESCRIPTION OF THE DRAWINGS

FIG. 8 is a flowchart illustrating a method for analysis of code coverage differences across environments, according to some embodiments.

Figure 1:
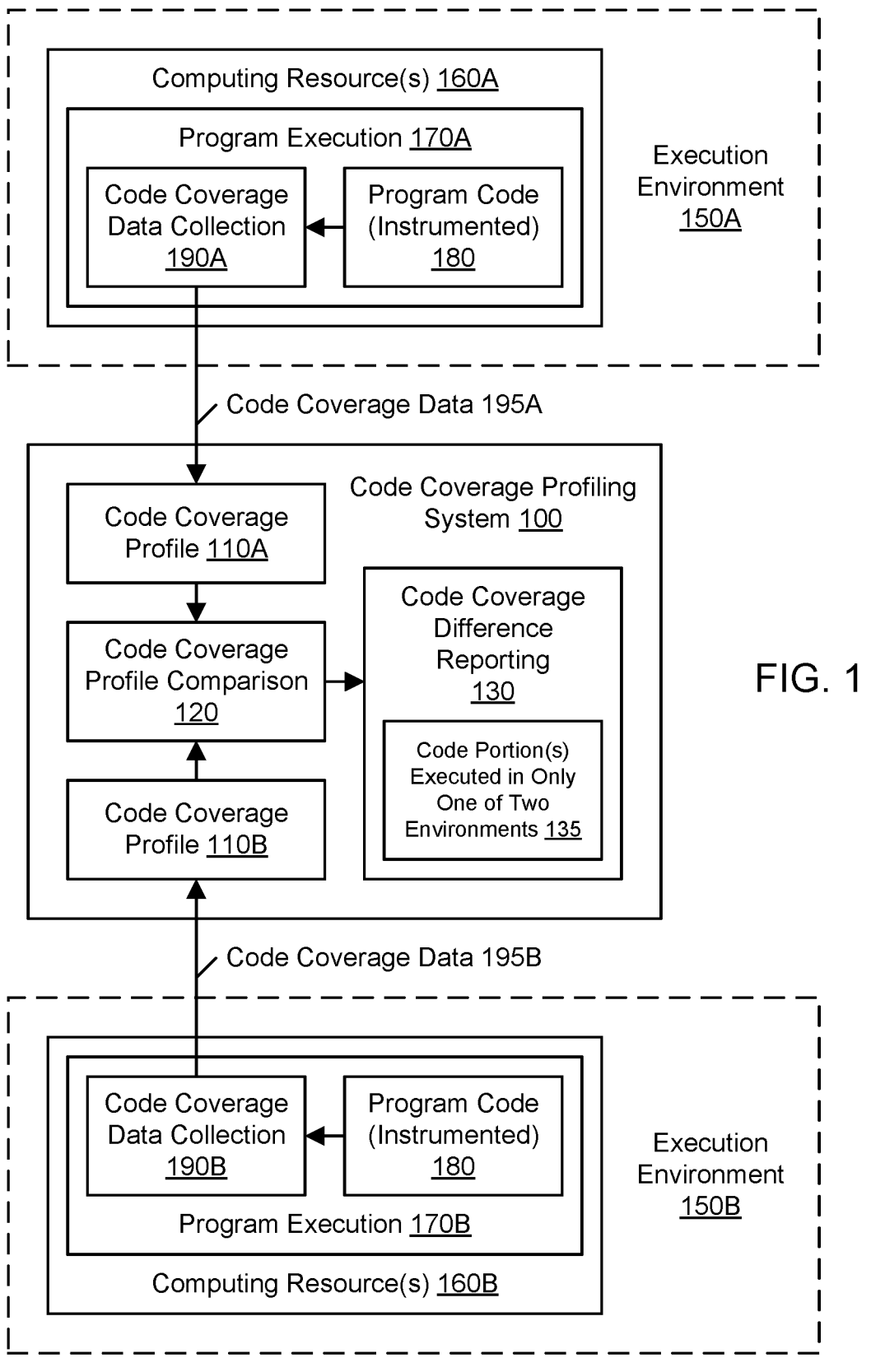
FIG. 1 illustrates an example system environment for analysis of code coverage differences across environments, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for analysis of code coverage differences across environments are described. Using the techniques described herein, code coverage data may be collected for a software product (e.g., a service or application) in at least two execution environments, code coverage profiles may be determined using the different sets of code coverage data, and a comparison of code coverage profiles may be performed to identify differences for the execution of the software product in the different environments. In some circumstances, the execution environments may include a test environment in which the software product is executed according to a suite of tests and a production environment in which the software product is executed according to requests from real-world clients. The code coverage data may be collected using instrumentation of program code associated with the software product. The code coverage data may include, for example, particular lines, methods, or code paths that were executed as well as a frequency of execution. A code coverage profile may indicate specific portions of the program code (e.g., at the level of parameters, statements, methods, and so on) that were executed across the various computing resources in a given environment over some period of time.

In a production environment, code coverage agents may run on a distributed set of computing resources (e.g., servers, containers, or resources of a serverless compute service) that execute the software product. The agents may collect code coverage data for execution of instrumented program code in the production environment. In some embodiments, to mitigate the performance impact of instrumentation and code coverage data collection, the level or frequency of instrumentation or code coverage data collection may be modified dynamically, e.g., to reduce data collection in response to increases in production traffic. The agents may send the collected code coverage data to a centralized component such as a code coverage profiling system. The code coverage profiling system may aggregate and/or merge the code coverage data from the various agents to generate a code coverage profile for the software product in the production environment over a period of time. The code coverage profiling system may perform an automated comparison (or other analysis) of the code coverage profile for the test environment and the code coverage profile for the production environment. The comparison may indicate one or more portions of program code that were executed in one environment but not the other environment. For example, the code coverage profiling system may determine that some portions of code were tested in the test environment but not executed in the production environment over some period of time. The code coverage profiling system may take one or more actions based (at least in part) on the analysis. In some embodiments, the one or more actions may include generating a report describing the differences between code coverage in the different environments. In some embodiments, the one or more actions may include recommending or performing removal of tests from an applicable test suite, recommending that additional tests be added to the test suite, and/or recommending removal of dead program code.

Using prior approaches to testing software, an entire suite of tests would often be run for every new version of a software product. In some development environments, code changes may be committed several times a day, and each code commit may undergo testing. As more and more tests are added throughout the life of the software product, the time and computing resources required to run the full suite of tests may become prohibitively expensive. However, if a developer manually selects a subset of tests to run, then the developer may mistakenly include irrelevant tests or exclude relevant tests. To address these problems, the code coverage profiling system described herein may perform code coverage analysis that compares a code coverage profile for a test environment to a code coverage profile for a production environment. The code coverage analysis may automatically identify portions of program code that are tested using the test suite but never executed in production. Such portions of program code may be mapped to one or more tests, and those one or more tests may be deprecated or otherwise removed from the test suite applicable to the software product. Similarly, the code coverage profiling system described herein may reduce the number of modules in a software product using code coverage analysis to identify portions of program code that are never executed in production. Such portions of program code may be deemed dead or unreachable and may be removed from the software product. In some embodiments, the code coverage profiling system may suggest relevant tests for portions of program code that are executed in production but not tested in the test environment.

As one skilled in the art will appreciate in light of this disclosure, embodiments may be capable of achieving certain improvements to computer technology, including some or all of the following technical effects: (1) improving the speed and efficiency of automated software testing due to the removal of tests from a test suite according to code coverage analysis; (2) improving the use of storage and memory resources for automated software testing due to the removal of tests from a test suite according to code coverage analysis; (3) improving the speed and efficiency of software execution due to the removal of dead or unreachable program code according to code coverage analysis; (4) improving the use of storage and memory resources for software execution due to the removal of dead or unreachable program code according to code coverage analysis; (5) reducing the performance impact of instrumentation and code coverage data collection by automatically dialing down the level of instrumentation or code coverage data collection (e.g., from per-line to per-method or disabling collection for high-throughput modules of the software product); (6) reducing the performance impact of instrumentation and code coverage data collection by automatically dialing down the frequency of instrumentation or code coverage data collection on a per-request or per-host basis (e.g., from 100% of requests to 50% of requests, from 100% of hosts to 50% of hosts, and so on); (7) reducing the performance impact of instrumentation and code coverage data collection by automatically disabling instrumentation or code coverage data collection on a per-request basis for particular attributes of requests (e.g., client identifiers); and so on.

FIG. 1 illustrates an example system environment for analysis of code coverage differences across environments, according to some embodiments. A code coverage profiling system 100 may identify differences for the execution of a software product in different environments 150A-150B. For example, the two environments 150A-150B may represent a test (or development or pre-production) environment and a production environment, two test (or development or pre-production) environments, two production environments, and so on. The program code 180 may represent instructions in a high-level programming language. The program code 180 may represent a set of files, modules, and/or other elements relating to a software product. The software product may represent a service or application. Program execution 170A of the code 180 for the software product may be performed in a particular execution environment 150A using one or more computing resources 160A. Program execution 170B of the code 180 for the software product may also be performed in a different execution environment 150B using one or more computing resources 160B. For example, the computing resources 160A-160B may include servers or hosts, containers, or resources of a serverless compute service that are used for executing the software product. The program execution 170A may be performed concurrently with the program execution 170B, or the program executions 170A-170B may be performed in serial. The program code 180 may be instrumented in order to produce code coverage data that can be collected by a code coverage data collection component 190A-190B. The manner of instrumentation may vary according to the language in which the code is written. For example, the JaCoCo library may be used for instrumentation of Java code for generation of code coverage data.

The code coverage profiling system 100 may acquire code coverage data 195A-195B for a software product (e.g., a service or application) in at least two execution environments such as environments 150A and 150B. The code coverage data 195A-195B may be collected using instrumentation of program code 180 associated with the software product. The code coverage data 195A-195B may include, for example, particular lines, methods, or code paths that were executed as well as a frequency of execution. The code coverage profiling system 100 may determine code coverage profiles 110A and 110B using the different sets of code coverage data 195A-195B. The code coverage profile 110A may indicate specific portions of the program code 180 (e.g., at the level of parameters, lines, statements, methods, and so on) that were executed across the various computing resources 160A in the execution environment 150A over some period of time. The code coverage profile 110B may indicate specific portions of the program code 180 (e.g., at the level of parameters, lines, statements, methods, and so on) that were executed across the various computing resources 160B in the execution environment 150B over some period of time.

Different portions of the program code 180 may be executed in the two environments 150A-150B. The code coverage profiling system 100 may perform a comparison 120 of the code coverage profiles 110A-110B to identify differences for the execution of the software product in the different environments 150A-150B. The comparison 120 may indicate one or more portions 135 of the program code 180 that were executed in one environment but not the other environment. For example, the code coverage profiling system may determine that some portions 135 of the code 180 were tested in a test environment but not executed in a production environment over some period of time. As another example, the code coverage profiling system may determine that some portions 135 of the code 180 were executed in a production environment but not tested in a test environment.

The code coverage profiling system 100 may take one or more actions based (at least in part) on the comparison 120. In some embodiments, the one or more actions may include generating a report describing the differences between code coverage in the different environments. As shown in the example of FIG. 1, the system 100 may include a code coverage difference reporting component 130. The reporting component may generate a report indicating the portions 135 of the code 180 that were executed in one of the twos environment but not executed in the other of the two environments. The report may be stored to a storage location, sent to a relevant user (e.g., a developer of the program code 180), and/or displayed in a user interface accessible by a developer of the program code. The report may identify the differing portions 135 by line, by method, or by another identification technique.

It is contemplated that the system 100 may include additional components not shown, fewer components than shown, or different combinations, configurations, or quantities of the components shown. The system 100 may comprise one or more computing devices, any of which may be implemented by the example computing device 900 illustrated in FIG. 9. In various embodiments, portions of the system 100 may be provided by the same computing device or by any suitable number of different computing devices. If any of the components of the system 100 are implemented using different computing devices, then the components and their respective computing devices may be communicatively coupled, e.g., via a network. Each of the illustrated components may represent any combination of software and hardware usable to perform their respective functions. It is contemplated that the system 100 may be invoked based (at least in part) on initial user input, e.g., through a user interface or API. However, beyond the invocation of the system 100, aspects of the functionality of the system may be performed in an automated manner without soliciting input from a user associated with the software product under analysis.

In one embodiment, the functionality of the system 100 as discussed herein may be provided to clients as a code coverage profiling service. The code coverage profiling service may be hosted in a multi-tenant provider network. The code coverage profiling service may assess fees to clients for tasks associated with code coverage profiling, e.g., the profile comparison 120 and difference reporting 130. The provider network may represent a network operated by an entity such as a business or a public-sector organization to provide one or more services and other computing resources (such as various types of cloud-based computing or storage) accessible via the Internet and/or other networks to a distributed set of clients. The provider network may include numerous data centers hosting various services and resource pools of computing resources, such as collections of physical and/or virtualized computer servers, storage devices, networking equipment and the like, that are used to implement and distribute the infrastructure and services offered by the provider. The provider network may offer some resource pools and services to multiple clients simultaneously and may thus be termed "multi-tenant." The computing resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). The provider network may offer a set of services whose functionality can be invoked by clients internal or external to the provider network. For example, the services may include "serverless" computing solutions that allocate and manage servers and hosts on behalf of clients, e.g., to execute client-specified functions. A number of different types of computing devices may be used singly or in combination to implement the resources of the provider network in different embodiments, including general purpose or special purpose computer servers, storage devices, network devices, and so on.

Figure 2:
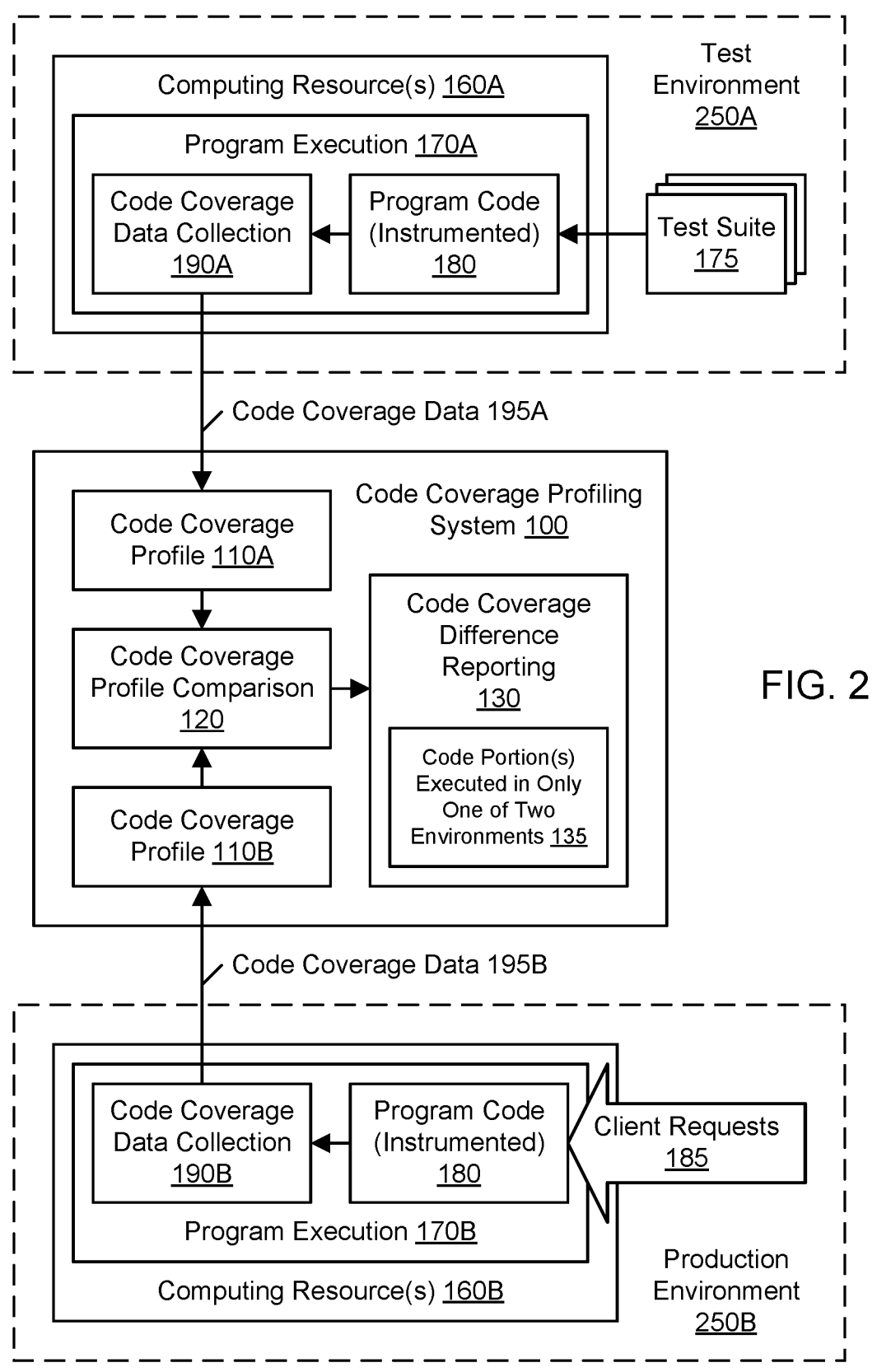
FIG. 2 illustrates further aspects of the example system environment for analysis of code coverage differences across environments, including a test environment and a production environment, according to some embodiments.

FIG. 2 illustrates further aspects of the example system environment for analysis of code coverage differences across environments, including a test environment and a production environment, according to some embodiments. The example system environment may comprise a test environment 250A. The test environment 250A may include various modules, components, or functionalities to implement testing of program code 180 of a software product according to tests in a test suite 175. The test environment 250A may be used to test a software product at build time, deployment time, or any other suitable time in the development cycle. The test environment 250A may be part of a testing framework that is available to developers of various types of software product. For example, software products to be tested using the test environment 250A may include services that collaborate with other services according to a service-oriented architecture. The testing may itself be implemented as a service whose functionality can be invoked by clients (including end users and/or other services) via a programmatic interface or user interface. In one embodiment, aspects of the testing may be activated as part of a deployment pipeline for deploying a software product to a production environment. In one embodiment, aspects of the testing may be part of or invoked by a continuous integration system or continuous deployment system. For example, program code for the software product may be stored by a managed source-control service that hosts repositories. Using an automated pipeline management service, the program code may be built, tested, and deployed for every code change or according to other triggers. The tests 175 and/or deployment to production may be performed automatically as part of such a pipeline.

In one embodiment, the suite of tests 175 may be determined based (at least in part) on user input. For example, a developer associated with program code 180 for a software product may supply or indicate tests that she or he deems to be relevant to the software product. However, some of the tests 175 may be relevant to portions of the software product that are not updated often, while others of the tests 175 may be relevant to portions of the software product that are more frequently updated, and yet others of the tests 175 may no longer be relevant to any portion of the software product due to maturation of the software product. Individual tests in the suite 175 may be configured with suitable parameters. In general, the test suite 175 may include performance tests such as sanity tests, latency tests, and/or load tests for scalability and throughput. Each test may be associated with an acceptable range of results, such that results outside the acceptable range may constitute a failure for that particular test. In one embodiment, the tests may include unit tests, e.g., tests in which the test host(s) do not access other systems over a network. In one embodiment, the tests may include integration tests, e.g., tests in which the test host(s) do access other systems over a network.

Execution of the tests 175 may be initiated automatically or manually. Tests 175 may be performed using execution 170A of the program code 180 using one or more computing resources 160A such as the example computing device 900 illustrated in FIG. 9. The tests 175 may be executed on an individual basis, either serially or in parallel. In one embodiment, the tests 175 may be executed on a single system such as a developer computer system or a suitable test host. In one embodiment, the tests may be executed on a set of computer systems such as a fleet of test hosts. In one embodiment, the tests may be executed in a test environment 250A in which the software product may be insulated from real-time interaction with real-world clients, e.g., by processing only synthetic requests or prerecorded client requests that were previously captured in a production environment. For example, if the software product implements a service that is associated with an electronic commerce (e-commerce) store, then the service may be configured to perform one or more suitable operations such as generating a web page (e.g., a product description page for a product offered for sale by the store), completing a sale or other transaction between the store and a customer, verifying a payment presented by the customer, etc.

The program code 180 may be instrumented such that the program execution 170A generates code coverage data 195A. A component for code coverage data collection 190A may collect the code coverage data 195A and provide it to a centralized component such as the code coverage profiling system 100. In various embodiments, any suitable code coverage product(s) may be used to implement the instrumentation and code coverage data collection 190A, including commercially available code coverage products. The manner of instrumentation may vary according to the language in which the code is written. For example, the JaCoCo library may be used for instrumentation of Java code for generation of code coverage data. For a particular test, the code coverage data 195A may indicate what portions (e.g., lines or methods) of the code were exercised (e.g., encountered, executed, or otherwise performed) by the test. In one embodiment, the code coverage data 195A may also indicate additional metrics, such as the percentage of code of a particular file or module that was exercised by a particular test or the frequency at which a line or method was executed.

In some embodiments, based (at least in part) on the code coverage data 195A, a mapping of the tests 175 to the program code 180 may be generated. The mapping may indicate what portions of the code 180 (if any) were exercised (e.g., encountered, executed, or otherwise performed) by each test in the suite of tests 175. The affected portions of the code may be indicated by line numbers within particular source files. In one embodiment, the mapping may indicate which methods, classes, packages, and/or groups were exercised by each test. The mapping may be stored in a data store for reference at a later time, e.g., by the code coverage profiling system 100. The system 100 may also maintain other test-related metadata, such as a history of test execution runtimes, test successes and/or failures, user feedback regarding tests, and so on.

The example system environment may comprise a production environment 250B. The production environment 250B may include various modules, components, or functionalities to implement execution 170B of program code 180 of a software product as the software product interacts with clients. Execution 170B in the production environment 170B may represent integration testing, end-to-end testing, or system testing, whereas execution 170A in the test environment 250A may often be restricted to unit testing. In the production environment 250B, the software product may be executed according to requests 185 from clients, potentially including other services in a service-oriented system whose functionality is invoked directly or indirectly by real-world clients. For example, if the software product provides a portion of a dynamically generated web page, then the software product may be invoked by a request from a page-building service of a web server, which may in turn be invoked by a request from a client of the web server. The execution 170B of the program code 180 may be performed one or more computing resources 160B such as the example computing device 900 illustrated in FIG. 9. In one embodiment, the program 180 may be executed on a set of computer resources 160B such as a fleet of test hosts. In one embodiment, the program 180 may be executed by a serverless compute service that manages its own computing resources 160B to execute client-specified programs or functions on behalf of clients. In one embodiment, the program 180 may be executed within a container.

In the production environment 250B, the program code 180 may be instrumented such that the program execution 170B generates code coverage data 195B. One or more components for code coverage data collection 190B may collect the code coverage data 195B and provide it to a centralized component such as the code coverage profiling system 100. In various embodiments, any suitable code coverage product(s) may be used to implement the instrumentation and code coverage data collection 190B, including commercially available code coverage products. The manner of instrumentation may vary according to the language in which the code is written and the nature of the computing resources 160B. For example, the JaCoCo library may be used for instrumentation of Java code for generation of code coverage data on a fleet of hosts. As another example, if the program code 180 represents a function to be executed by a serverless compute service, then the program code may reference or include a code coverage library that can instrument the code within the serverless compute service. The code coverage data 195B may indicate what portions (e.g., lines or methods) of the code were exercised (e.g., encountered, executed, or otherwise performed) by the program execution 170B. In one embodiment, the code coverage data 195B may also indicate additional metrics, such as the percentage of code of a particular file or module that was exercised or the frequency at which a line or method was executed.

The comparison 120 may determine any portions of program code that were executed in the test environment 250A but not the production environment 250B. The comparison 120 may determine any portions of program code that were executed in the production environment 250B but not the test environment 250A. The comparison 120 may be associated with some period of time. In some embodiments, the comparison 120 may determine any differences between the frequency of execution of various portions of program code between the two environments. In some embodiments, the comparison 120 may be used to inform an approval step in a deployment pipeline. For example, a developer may be informed that the program code contains large portions that are executed by real-world clients but not by the tests 175, and the developer may be given the option to perform a rollback of the program code to a previous version.

Figure 3:
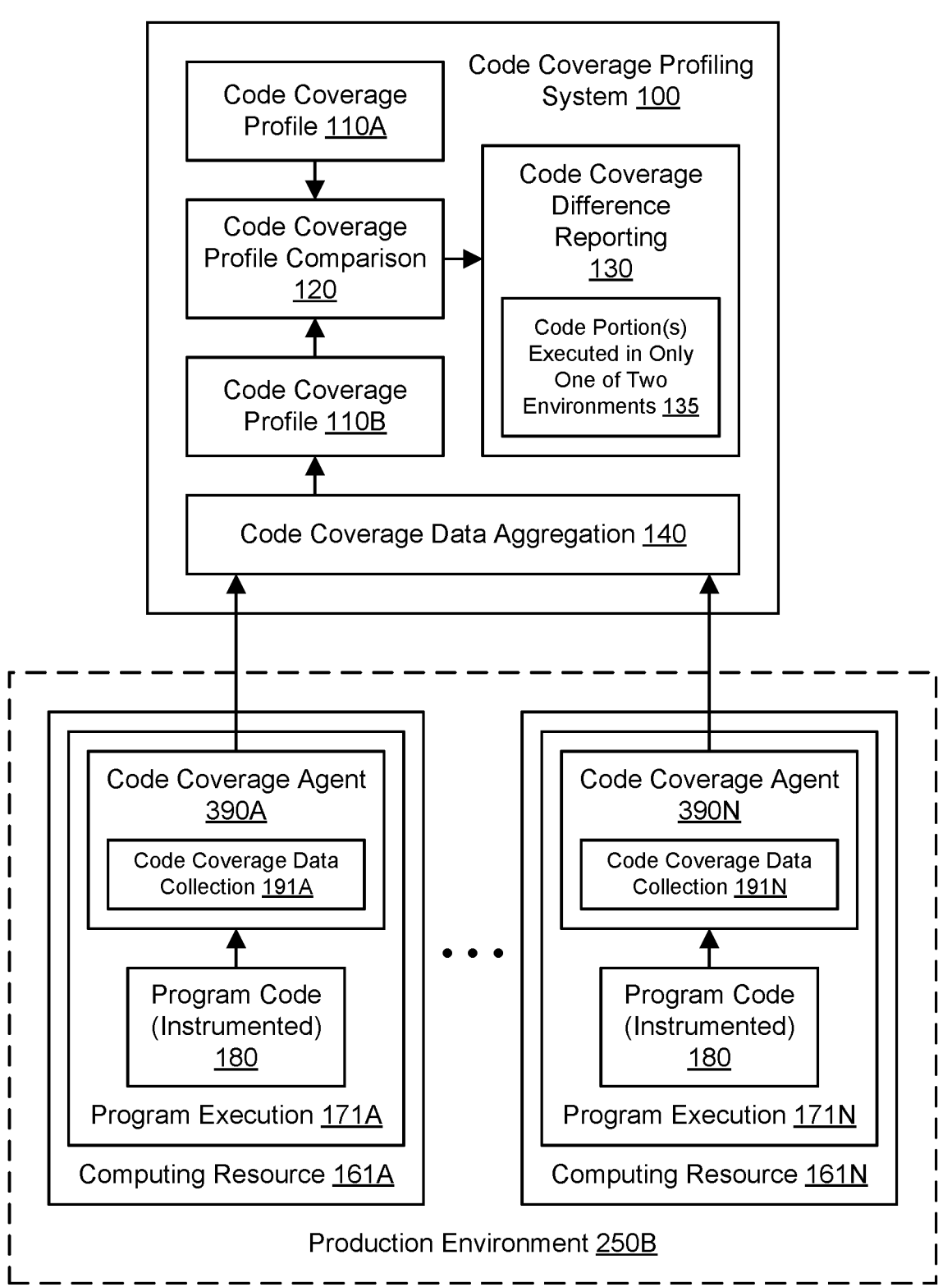
FIG. 3 illustrates further aspects of the example system environment for analysis of code coverage differences across environments, including the use of agents for code coverage data collection in a production environment, according to some embodiments.

FIG. 3 illustrates further aspects of the example system environment for analysis of code coverage differences across environments, including the use of agents for code coverage data collection in a production environment, according to some embodiments. In a production environment 250B, code coverage agents 390A-390N may run on a distributed set of computing resources 161A-161N (e.g., servers or hosts, containers, or resources of a serverless compute service) that execute the software product. The agents 390A-390N may collect code coverage data 191A-191N resulting from execution of instrumented program code 180 in the production environment 250B. As shown in the example of FIG. 3, program execution 117A may be performed on one computing resource 161A, and a code coverage agent 390A associated with that resource may perform code coverage data collection 191A. Similarly, program execution 117N may be performed on another computing resource 161N, and a code coverage agent 390N associated with that resource may perform code coverage data collection 191N. For a software product deployed to a fleet of servers, agents 390A-390N may run on those servers in order to collect code coverage data produced by program execution 171A-171N on those servers. For a software product that is implemented using a serverless compute service, agents 390A-390N may be resident on the serverless compute service to collect code coverage data produced by program execution 171A-171N by the service.

The agents 390A-390N may send the collected code coverage data 191A-191N to a centralized component such as a code coverage profiling system 100. Using a component 140 for code coverage data aggregation, the code coverage profiling system 100 may aggregate and/or merge the code coverage data 191A-191N from the various agents 390A-390N to generate a code coverage profile 110B for the software product in the production environment over a period of time. Different portions of the code 180 may be executed on different ones of the computing resources 161A-161N. Using the aggregation 140, the resulting code coverage profile 110B may indicate portions of the program code 180 that were executed on any of the computing resources 161A-161N over the period of time. In some embodiments, the resulting code coverage profile 110B may indicate a frequency of execution of portions of the program code 180 across the computing resources 161A-161N over the period of time.

Figure 4:
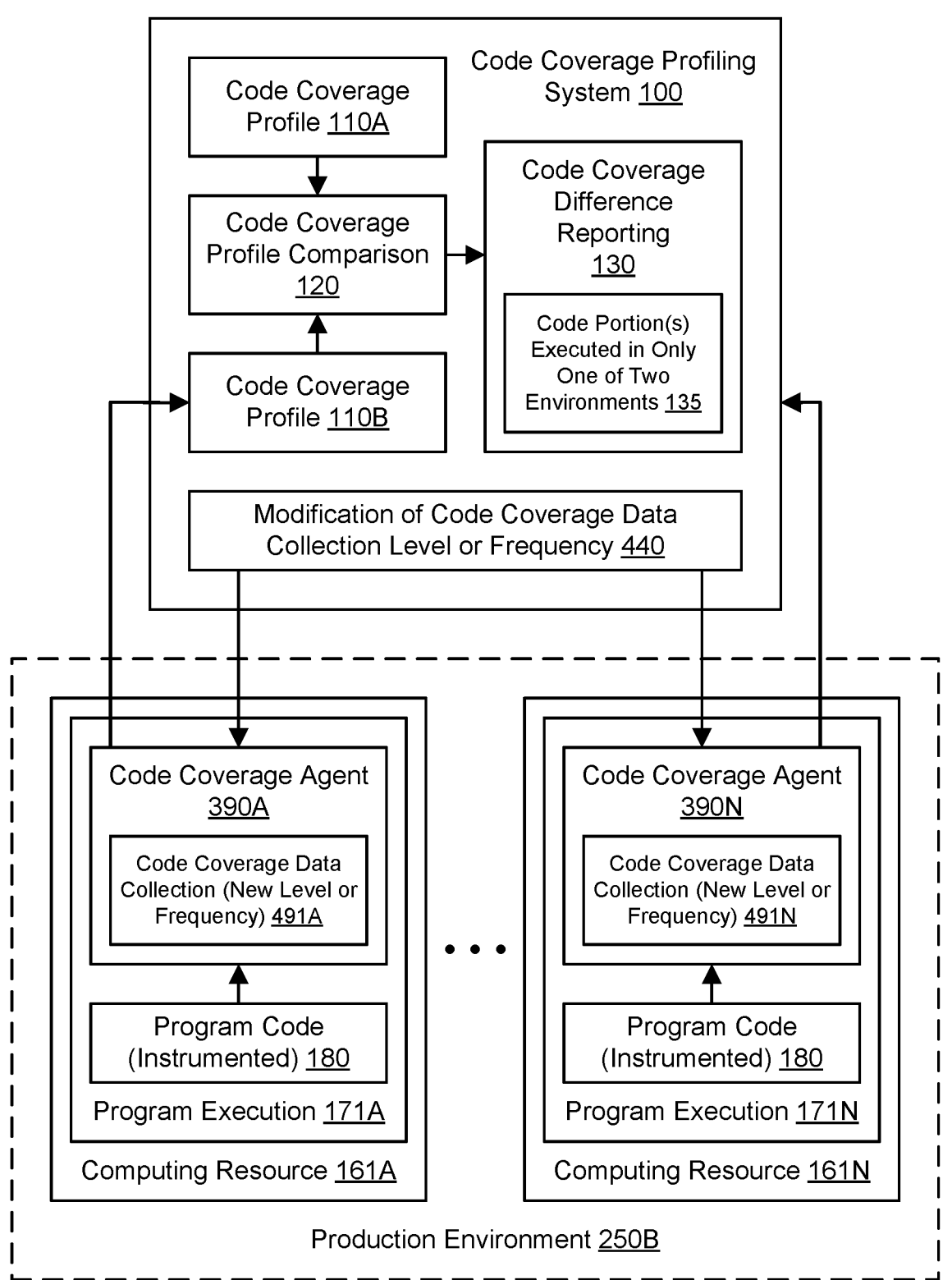
FIG. 4 illustrates further aspects of the example system environment for analysis of code coverage differences across environments, including a centralized determination to modify the level or frequency of code coverage data collection using multiple agents in a production environment, according to some embodiments.

FIG. 4 illustrates further aspects of the example system environment for analysis of code coverage differences across environments, including a centralized determination to modify the level or frequency of code coverage data collection using multiple agents in a production environment, according to some embodiments. In some embodiments, to mitigate the performance impact of instrumentation and code coverage data collection on production resources 161A-161N, the level or frequency of instrumentation or code coverage data collection may be modified dynamically, e.g., to reduce data collection in response to increases in production traffic. In some embodiments, the system 100 may include a component 440 for modification of code coverage data collection level or frequency. The component 440 may determine a new level or frequency for instrumentation or code coverage data collection and may instruct one or more of the agents 390A-390N to modify the code coverage data collection accordingly. In one embodiment, as a result of this instruction from the component 440, the agent 390A may perform code coverage data collection 491A at a new level or frequency, and the agent 390N may perform code coverage data collection 491N at the new level or frequency.

The level of instrumentation or data collection may relate to the granularity of code coverage, e.g., per parameter, per statement, per method, and so on. For example, as production traffic increases (e.g., the rate of requests 185 increases), the level of instrumentation may be changed from per-statement to per-method to reduce the performance impact of code coverage data collection on the resources 161A-161N. Conversely, the level of instrumentation may be increased from per-method to per-statement as production traffic drops. The frequency of instrumentation or data collection may be changed on a per-agent (or per-host) basis or across all the agents (and corresponding hosts) uniformly. For example, the sampling rate of code coverage data collection may be increased or decreased (e.g., from 100% to 50% of requests) across all hosts or for one or more specific hosts. In some embodiments, some agents may be instructed to discontinue instrumentation or data collection, while other agents (e.g., 10% of the total set of agents) may continue instrumentation or data collection. In some embodiments, instrumentation or data collection may be discontinued for some portions of the program code 180 (e.g., high-throughput portions) but continued for other portions. In some embodiments, instrumentation or data collection may be dynamically enabled or disabled based (at least in part) on attributes of requests. For example, instrumentation or data collection may be disabled for particular clients using a client identifier specified in the requests 185.

Figure 5:
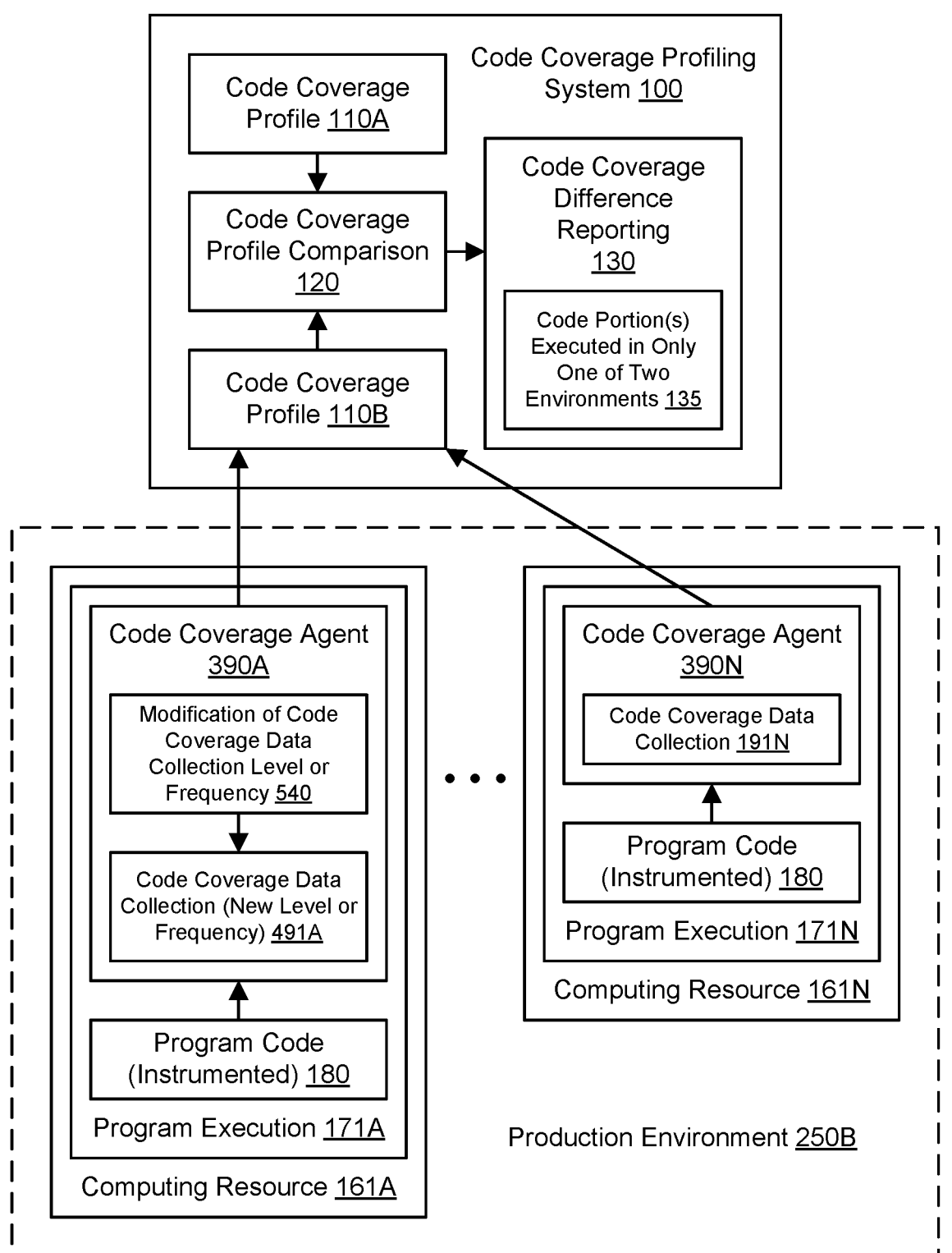
FIG. 5 illustrates further aspects of the example system environment for analysis of code coverage differences across environments, including an agent-specific determination to modify the level or frequency of code coverage data collection in a production environment, according to some embodiments.

FIG. 5 illustrates further aspects of the example system environment for analysis of code coverage differences across environments, including an agent-specific determination to modify the level or frequency of code coverage data collection in a production environment, according to some embodiments. In some embodiments, to mitigate the performance impact of instrumentation and code coverage data collection on production resources 161A-161N, the level or frequency of instrumentation or code coverage data collection may be modified dynamically on a per-host basis. For example, if request traffic to a particular computing resource 161A rises to meet or exceed a threshold, then the agent 390A for that resource may implement modification 540 of the code coverage data collection level or frequency. As a result of this modification 540, the agent 390A may perform code coverage data collection 491A at the new level or frequency. However, another agent 390N in the same production environment 250B may continue to perform code coverage data collection 191N at the existing level or frequency. Conversely, if request traffic to the particular computing resource 161A falls below the threshold, then the agent 390A for that resource may return the code coverage data collection level or frequency to the previous level. As discussed above with reference to FIG. 4, changing the code coverage data collection level or frequency at a particular host may involve changing the granularity at which code coverage data is collected, changing the percentage of requests for which code coverage data is collected, disabling or enabling code coverage data collection for specific portions of the program code 180, disabling or enabling code coverage data collection for specific request attributes, and so on.

Figure 6:
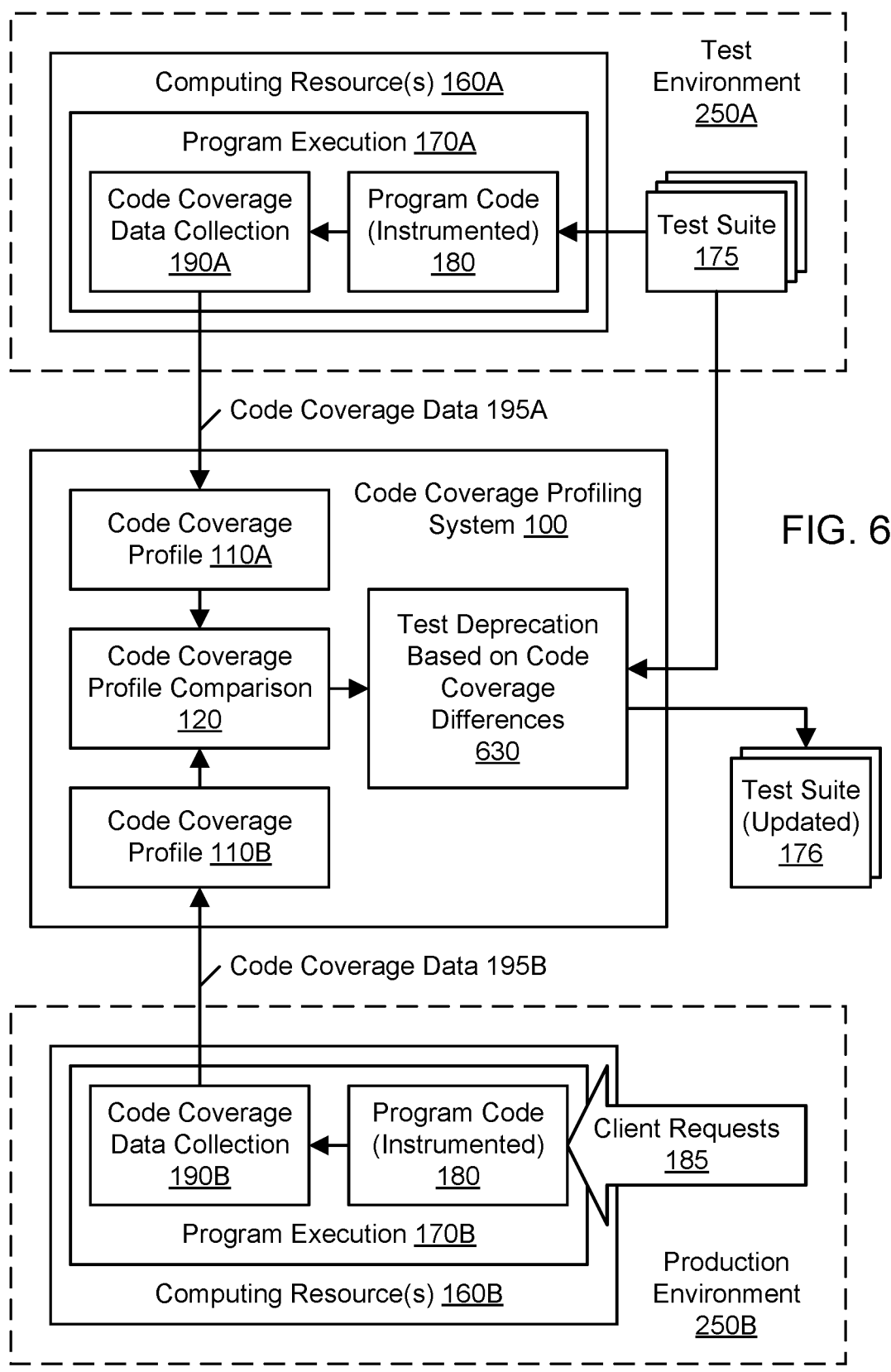
FIG. 6 illustrates further aspects of the example system environment for analysis of code coverage differences across environments, including test deprecation based (at least in part) on code coverage differences, according to some embodiments.

FIG. 6 illustrates further aspects of the example system environment for analysis of code coverage differences across environments, including test deprecation based (at least in part) on code coverage differences, according to some embodiments. As a software product matures, more and more tests may be added to the test suite 175 associated with that software product. Over time, some tests may become outdated in that they are no longer exercised by any portion of the program code for that software product. Some tests may never be relevant to code that is used in production. A test deprecation component 630 may be used to identify and remedy these outdated and/or irrelevant tests. In some embodiments, the code coverage profile comparison 120 may identify one or more portions of the program code 180 that were executed in the test environment 250A but not executed in the production environment 250B. Using a mapping of tests to portions of the program code 180, the test deprecation component 630 may identify one or more tests associated with the portions of program code that were executed in the test environment 250A but not executed in the production environment 250B. In some embodiments, the test deprecation component 630 may automatically deprecate or remove the identified test(s) from the test suite 175 applicable to the software product, thus generating an updated test suite 176 with fewer tests. In some embodiments, the test deprecation component 630 may remove one or more tests from the test suite 175 based (at least in part) on user input, e.g., input confirming a recommendation to deprecate the test(s). Each test may consume computing resources during the execution of the test. By deprecating and/or removing tests that are irrelevant to a particular software product, the system 100 may improve the speed and efficiency of the testing process.

In one embodiment, one or more machine learning models may be used to determine and recommend tests to be added to the test suite 175. The one or more machine learning models may determine any tests that are likely to exercise the portions of the program code 180 that were executed in the production environment 250B but not in the test environment 250A. For example, the similarity of the untested program code to the program code of other software products (that are mapped to various tests using the above-mentioned mapping) may be assessed using machine learning so that relevant tests can be selected. In one embodiment, a confidence score may be determined for each test in a suite of tests, where the confidence score represents the likelihood that a test will exercise the untested portions of code, and tests whose confidences scores meet a predetermined confidence threshold may be recommended while tests that fail to meet the confidence threshold may be excluded from a recommendation. In one embodiment, the number (N) of tests to be recommended may be determined based (at least in part) on user input, and the N tests having the highest confidence scores may be included in the selected subset. In one embodiment, a newly submitted test (e.g., a test submitted with the new version of the program code) may be added to the test suite 175 automatically to ensure that the new test is run at least once.

Figure 7:
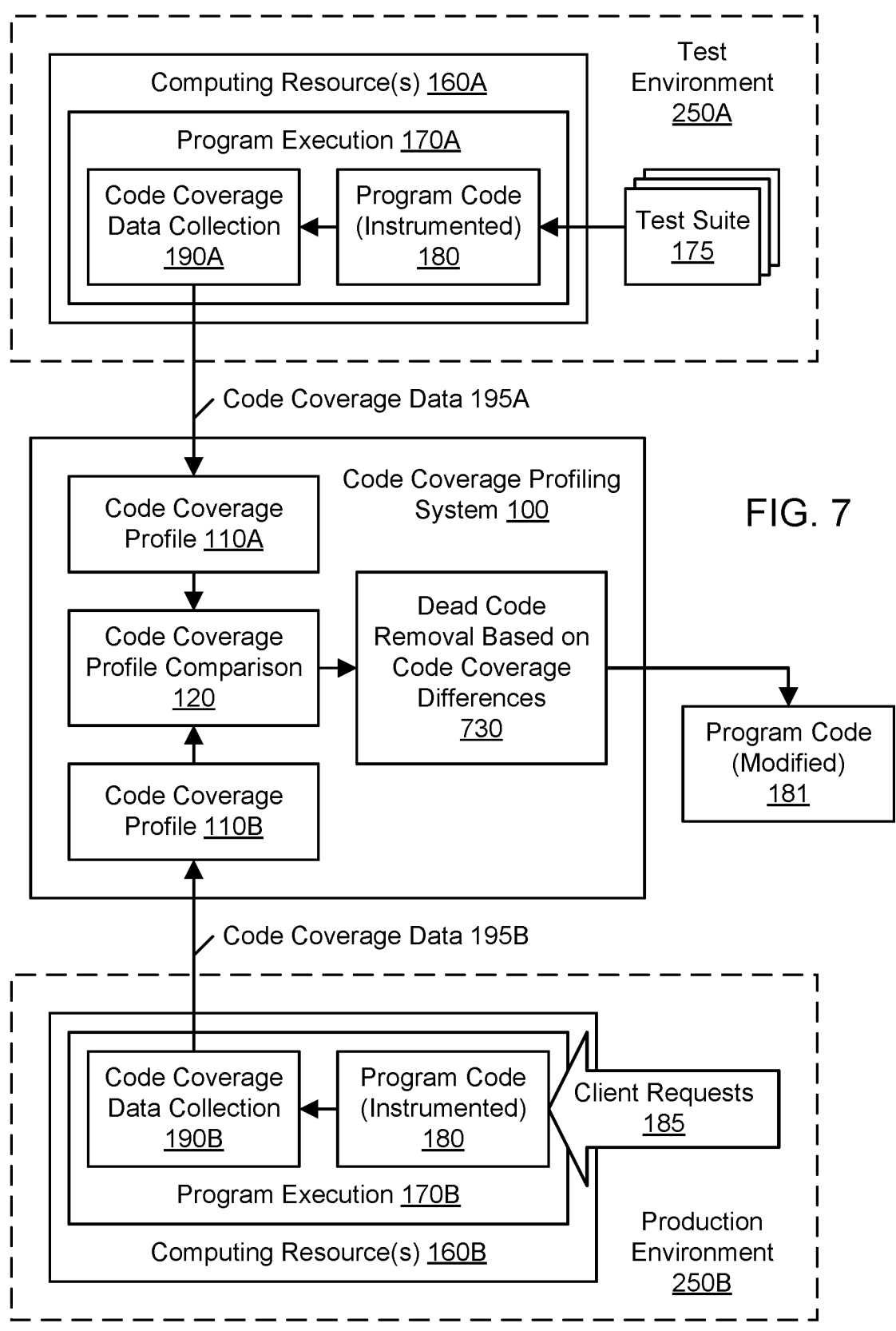
FIG. 7 illustrates further aspects of the example system environment for analysis of code coverage differences across environments, including removal of dead or unreachable program code based (at least in part) on code coverage differences, according to some embodiments.

FIG. 7 illustrates further aspects of the example system environment for analysis of code coverage differences across environments, including removal of dead or unreachable program code based (at least in part) on code coverage differences, according to some embodiments. In some embodiments, the code coverage profile comparison 120 may identify one or more portions of the program code 180 that were executed in the test environment 250A but not executed in the production environment 250B. The portions of the program code 180 that were not executed in the production environment 250B may be deemed dead, unreachable, or otherwise unnecessary to the proper function of the corresponding software product. A dead code removal component 730 may be used to identify and remedy these portions of code. In some embodiments, the dead code removal component 730 may automatically remove the identified portion(s) from the program code 180 of the software product, thus generating a modified set of program code 181. In some embodiments, the dead code removal component 730 may remove one or more portions from the program code 180 based (at least in part) on user input, e.g., input confirming a recommendation to remove the portion (s). By removing portions of program code that are never executed in production, the system 100 may improve the speed and resource usage of the corresponding software product.

FIG. 8 is a flowchart illustrating a method for analysis of code coverage differences across environments, according to some embodiments. As shown in 800, program code for a software product may be executed in a first execution environment. The first environment may represent a test environment in which the software product is executed according to one or more tests in a test suite. The test suite may not exercise every line or method in the code. For example, only 70% of the lines of code may be executed during the tests, while 30% may remain untested. The execution of the software product in the first environment may generate a first set of code coverage data. The first set of code coverage data may be collected using instrumentation of program code associated with the software product. The manner of instrumentation may vary according to the language in which the code is written. For example, the JaCoCo library may be used for instrumentation of Java code for generation of code coverage data. The first set of code coverage data may include, for example, particular lines, methods, or code paths that were executed as well as a frequency of execution.

As shown in 810, a first code coverage profile may be determined by a code coverage profiling system using the first set of code coverage data. The first code coverage profile may indicate one or more portions (e.g., lines, methods, and so on) of the program code of the software product that were executed in the first environment over some period of time (e.g., a period of time in which the tests were performed).

As shown in 820, the program code for a software product may be executed in a second execution environment. The second environment may represent a production environment in which the software product is executed according to one or more requests from clients (including other services in a service-oriented system whose functionality is invoked directly or indirectly by real-world clients). Again, the client requests may not exercise every line or method in the code. However, the portions of the code that are executed in the second environment may differ from the portions of the code that are executed in the first environment. The execution of the software product in the second environment may generate a second set of code coverage data. The second set of code coverage data may be collected using instrumentation of the program code associated with the software product. The second set of code coverage data may include, for example, particular lines, methods, or code paths that were executed as well as a frequency of execution.

As shown in 830, a second code coverage profile may be determined by the code coverage profiling system using the second set of code coverage data. The second code coverage profile may indicate one or more portions (e.g., lines, methods, and so on) of the program code of the software product that were executed in the second environment over some period of time. In a production environment, code coverage agents may run on a distributed set of computing resources (e.g., servers, containers, or resources of a serverless compute service) that execute the software product. The agents may collect code coverage data for execution of instrumented program code in the production environment and send the collected code coverage data to a centralized component such as the code coverage profiling system. The code coverage profiling system may aggregate the code coverage data from the various agents to generate the second code coverage profile.

As shown in 840, the code coverage profiling system may perform a comparison of the first code coverage profile and the second code coverage profile. The comparison may determine any differences between the portions of program code that were executed in one environment but not the other environment. For example, the code coverage profiling system may determine that some portions of code were tested in the test environment but not executed in the production environment over some period of time. In some embodiments, the comparison may determine any differences between the frequency of execution of various portions of program code between the two environments.

As shown in 850, one or more actions may be performed based (at least in part) on the comparison. In some embodiments, the one or more actions may include the code coverage profiling system generating a report describing the differences between code coverage in the different environments. In some embodiments, the one or more actions may include the code coverage profiling system recommending or performing removal of tests from an applicable test suite or recommending that additional tests be added to the test suite. In some embodiments, the one or more actions may include the code coverage profiling system recommending removal of dead program code or soliciting user input for approval of automatically removing dead program code.

Illustrative Computer System

Figure 9:
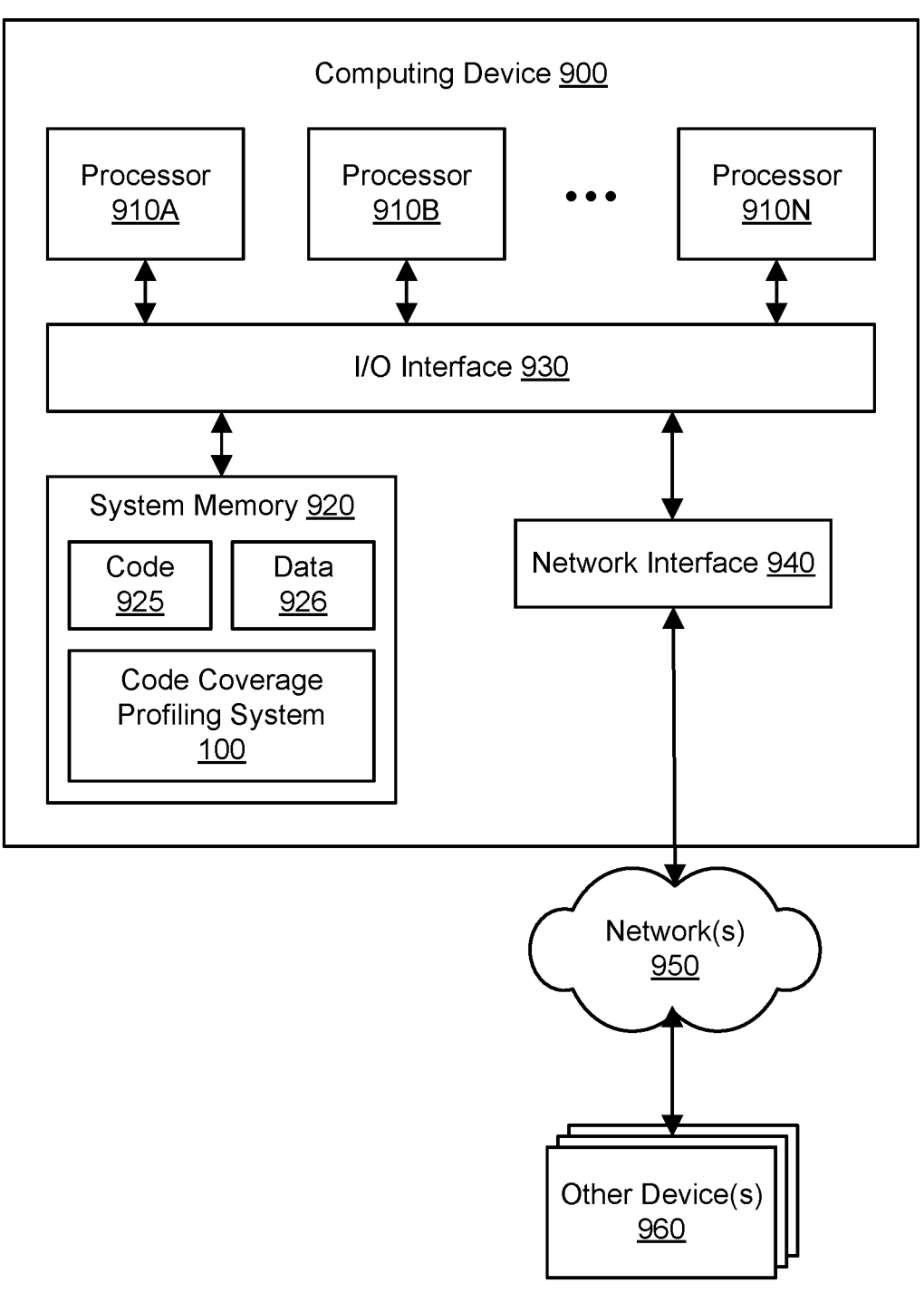
FIG. 9 illustrates an example computing device that may be used in some embodiments.

In at least some embodiments, a computer system that implements a portion or all of one or more of the technologies described herein may include a computer system that includes or is configured to access one or more computer-readable media. FIG. 9 illustrates such a computing device 900, according to some embodiments. In the illustrated embodiment, computing device 900 includes one or more processors 910A-910N coupled to a system memory 920 via an input/output (I/O) interface 930. In one embodiment, computing device 900 further includes a network interface 940 coupled to I/O interface 930.

In various embodiments, computing device 900 may be a uniprocessor system including one processor or a multiprocessor system including several processors 910A-910N (e.g., two, four, eight, or another suitable number). In one embodiment, processors 910A-910N may include any suitable processors capable of executing instructions. For example, in various embodiments, processors 910A-910N may be processors implementing any of a variety of instruction set architectures (ISAs), such as the x86, PowerPC, SPARC, or MIPS ISAs, or any other suitable ISA. In one embodiment, in multiprocessor systems, each of processors 910A-910N may commonly, but not necessarily, implement the same ISA.

In one embodiment, system memory 920 may be configured to store program instructions and data accessible by processor(s) 910A-910N. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 920 as code (i.e., program instructions) 925 and data 926. In one embodiment, the memory 920 may store program instructions for implementing at least some aspects of the code coverage profiling system 100.

In one embodiment, I/O interface 930 may be configured to coordinate I/O traffic between processors 910A-910N, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processors 910A-910N). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. In some embodiments, some or all of the functionality of I/O interface 930, such as an interface to system memory 920, may be incorporated directly into processors 910A-910N.

In one embodiment, network interface 940 may be configured to allow data to be exchanged between computing device 900 and other devices 960 attached to a network or networks 950. In various embodiments, network interface 940 may support communication via any suitable wired or wireless general data networks, such as types of Ethernet network, for example. Additionally, in some embodiments, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 900 via I/O interface 930. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 900 as system memory 920 or another type of memory. In one embodiment, a computer-readable medium may include transmission media or signals such as electrical, electromagnetic, or digital signals, conveyed via a communication medium such as a network and/or a wireless link, such as may be implemented via network interface 940. The described functionality may be implemented using one or more non-transitory computer-readable storage media storing program instructions that are executed on or across one or more processors. Portions or all of multiple computing devices such as that illustrated in FIG. 9 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:

one or more processors; and a memory storing computer-executable instructions that, when executed, cause the one or more processors to:

determine, by a plurality of code coverage agents of a code coverage profiling system, respective agent-specific levels of instrumentation to collect code coverage data from respective computing resources;

collect, from the plurality of agents during a time period, respective code coverage data from the respective computing resources that respective code coverage agents of the plurality of code coverage agents are in, wherein the respective computing resources are associated with execution of a program code of a software product in a production environment, and wherein the respective code coverage data indicates specific portions of the program code that are executed in the respective computing resources and respective frequency of execution of the specific portions at the respective agent-specific levels of instrumentation, and wherein at least a portion of the respective agent-specific levels of instrumentation used in collecting the respective code coverage data from different ones of the plurality of agents are at different levels of granularity of code coverage during the time period;

merge the respective code coverage data to generate a first code coverage profile comprising the different levels of granularity of code coverage, wherein the first code coverage profile comprises an aggregate of the respective code coverage data, wherein the respective code coverage data are at the respective agent-specific levels of instrumentation, and wherein at least a portion of the respective agent-specific levels of instrumentation for the respective code coverage data are at the different levels of granularity of code coverage; and perform, by the code coverage profiling system, a comparison of the first code coverage profile and a second code coverage profile associated with execution of the program code in a test environment, to determine a difference between one or more portions of the program code that were executed in the production environment and one or more portions of the program code that were executed in the test environment, wherein the comparison is based, at least in part, on the respective frequency of execution of the specific portions at the respective agent-specific levels of instrumentation.

2. The system as recited in claim 1, wherein the agent-specific levels of instrumentation to collect the respective code coverage data from the respective computing resources are determined based on a threshold level of request traffic to the respective computing resources.

3. The system as recited in claim 1, wherein the comparison determines one or more portions of the software product that were executed in the production environment and not executed in the test environment.

4. The system as recited in claim 1, wherein the memory stores additional computer-executable instructions that, when executed, cause the one or more processors to:

decrease, by selected agents of the plurality of agents, the agent-specific levels of instrumentation of the program code in resources associated with the selected agents, wherein the agent-specific levels of instrumentation are decreased based at least in part on an increase in request traffic to selected computing resources of the selected agents.

5. A method, comprising:

determining, by a plurality of code coverage agents of a code coverage profiling system, respective agent-specific levels of instrumentation for collecting code coverage data from respective computing resources;

collecting, from the plurality of agents during a time period, respective code coverage data from the respective computing resources that respective code coverage agents of the plurality of code coverage agents are in, wherein the respective computing resources are associated with execution of a program code of a software product in a first environment, and wherein the respective code coverage data indicates specific portions of the program code that are executed in the respective computing resources and respective frequency of execution of the specific portions at the respective agent-specific levels of instrumentation, and wherein at least a portion of the respective agent-specific levels of instrumentation used in collecting the respective code coverage data from different ones of the plurality of agents are at different levels of granularity of code coverage during the time period;

merging the respective code coverage data to generate a first code coverage profile comprising the different levels of granularity of code coverage, wherein the first code coverage profile comprises an aggregate of the respective code coverage data, wherein the respective code coverage data are at the respective agent-specific levels of instrumentation, and wherein at least a portion of the respective agent-specific levels of instrumentation for the respective code coverage data are at the different levels of granularity of code coverage; and performing, by the code coverage profiling system, a comparison of the first code coverage profile and a second code coverage profile associated with execution of the program code in a second environment, to determine a difference between one or more portions of the program code that were executed in the first environment and one or more portions of the program code that were executed in the second environment, wherein the comparison is based, at least in part, on the respective frequency of execution of the specific portions at the respective agent-specific levels of instrumentation.

6. The method as recited in claim 5, wherein the first environment comprises a production environment, wherein the program code is executed according to a plurality of requests from clients in the production environment, wherein the second environment comprises a test environment, and wherein the program code is executed according to one or more tests in the test environment.

7. The method as recited in claim 6, wherein the agent-specific levels of instrumentation to collect the respective code coverage data from the respective computing resources are based on a threshold level of request traffic to the respective computing resources.

8. The method as recited in claim 6, wherein the comparison determines one or more portions of the program code that were executed in the test environment and not executed in the production environment.

9. The method as recited in claim 6, further comprising:

generating a report describing the difference between the one or more portions of the software product that were executed in the test environment and the one or more portions of the software product that were executed in the production environment.

10. The method as recited in claim 6, wherein the method further comprises:

decreasing, by selected agents of the plurality of agents, the agent-specific levels of instrumentation of the program code in resources associated with the selected agents, wherein the agent-specific levels of instrumentation are decreased based at least in part on an increase in request traffic to selected computing resources of the selected agents.

11. The method as recited in claim 6, wherein the method further comprises:

discontinuing, by selected agents of the plurality of agents, the agent-specific levels of instrumentation of one or more portions of the program code in the production environment, wherein the instrumentation is discontinued based at least in part on an increase in request traffic to selected computing resources of the selected agents.

12. The method as recited in claim 6, wherein the method further comprises:

decreasing a percentage of the plurality of requests from clients in the production environment for which the code coverage data are collected.

13. The method as recited in claim 6, wherein the method further comprises:

decreasing a percentage of the computing resources for which the code coverage data are collected.

14. The method as recited in claim 6, wherein the method further comprises:

discontinuing or initiating collection of the code coverage data for a particular one or more of the clients in the production environment based at least in part on one or more parameters of the requests.

15. One or more non-transitory computer-readable storage media storing program instructions that, when executed on or across one or more processors, perform:

determining, by a plurality of code coverage agents of a code coverage profiling system, respective agent-specific level of instrumentation for collecting code coverage data from respective computing resources;

collecting, from the plurality of agents during a time period, respective code coverage data from the respective computing resources that respective code coverage agents of the plurality of code coverage agents are in, wherein the respective computing resources are associated with execution of a program code of a software product in a first environment, and wherein the respective code coverage data indicates specific portions of the program code that are executed in the respective computing resources and respective frequency of execution of the specific portions at the respective agent-specific levels of instrumentation, and wherein at least a portion of the respective agent-specific levels of instrumentation used in collecting the respective code coverage data from different ones of the plurality of agents are at different levels of granularity of code coverage during the time period;

merging the respective code coverage data to generate a first code coverage profile comprising the different levels of granularity of code coverage, wherein the first code coverage profile comprises an aggregate of the respective code coverage data, wherein the respective code coverage data are at the respective agent-specific levels of instrumentation, and wherein at least a portion of the respective agent-specific levels of instrumentation for the respective code coverage data are at the different levels of granularity of code coverage; and performing, by the code coverage profiling system, a comparison of the first code coverage profile and a second code coverage profile associated with execution of the program code in a second environment, to determine a difference between one or more portions of the program code that were executed in the first environment and one or more portions of the program code that were executed in the second environment, wherein the comparison is based, at least in part, on the respective frequency of execution of the specific portions at the respective agent-specific levels of instrumentation.

16. The one or more non-transitory computer-readable storage media as recited in claim 15, wherein the first environment comprises a production environment, wherein the program code is executed according to a plurality of requests from clients in the production environment, wherein the second environment comprises a test environment, and wherein the program code is executed according to one or more tests in the test environment.

17. The one or more non-transitory computer-readable storage media as recited in claim 16, wherein the agent-specific levels of instrumentation to collect the respective code coverage data from the respective computing resources are based on a threshold level of request traffic to the respective computing resources.

18. The one or more non-transitory computer-readable storage media as recited in claim 16, wherein the storage media further comprise additional program instructions that, when executed on or across the one or more processors, perform:

generating a report describing the difference between the one or more portions of the software product that were executed in the test environment and the one or more portions of the software product that were executed in the production environment.

19. The one or more non-transitory computer-readable storage media as recited in claim 16, wherein the storage media further comprise additional program instructions that, when executed on or across the one or more processors, perform:

decreasing, by selected agents of the plurality of agents, the agent-specific levels of instrumentation of the program code in resources associated with the selected agents, wherein the agent-specific levels of instrumentation are decreased based at least in part on an increase in request traffic to selected computing resources of the selected agents.

20. The one or more non-transitory computer-readable storage media as recited in claim 16, wherein the storage media further comprise additional program instructions that, when executed on or across the one or more processors, perform:

discontinuing, by selected agents of the plurality of agents, the agent-specific levels of instrumentation of one or more portions of the program code in the production environment, wherein the instrumentation is discontinued based at least in part on an increase in request traffic to selected computing resources of the selected agents.

* * * * *